United States Patent [19]

Armstrong

[11] 4,410,149

[45] Oct. 18, 1983

[54] TRANSPORT APPARATUS FOR USE WITH A LINEAR TAPE RECORDER

[75] Inventor: Lee B. Armstrong, San Clemente, Calif.

[73] Assignee: Eastman Technology, Inc., Rochester, N.Y.

[21] Appl. No.: 309,344

[22] Filed: Oct. 7, 1981

[51] Int. Cl.³ .................... G03B 1/04; G11B 15/32; G11B 23/04

[52] U.S. Cl. .................... 242/200; 242/208; 226/194; 360/96.5

[58] Field of Search ............... 242/198–210; 360/93, 95, 96.5, 132; 226/188, 190, 194

[56] References Cited

U.S. PATENT DOCUMENTS

| | | | |
|---|---|---|---|
| 3,038,678 | 6/1962 | Papst | 242/208 |
| 3,373,951 | 3/1968 | Mazoyer | 242/200 |
| 3,570,737 | 3/1971 | Sanford | 226/188 |
| 3,734,426 | 5/1973 | Howes et al. | 242/190 |
| 3,802,648 | 4/1974 | Kihara et al. | 242/199 |
| 3,902,680 | 9/1975 | Neff | 242/198 |
| 4,085,906 | 4/1978 | Dahl et al. | 242/192 |
| 4,152,738 | 5/1979 | Shimizu et al. | 360/95 |
| 4,231,504 | 11/1980 | Ketzer | 226/180 |

*Primary Examiner*—Leonard D. Christian
*Attorney, Agent, or Firm*—Robert F. Cody

[57] ABSTRACT

With a tape container inserted into the disclosed recorder, two reel drives, two tape guiding and tensioning devices, and a capstan "all" enter cutouts within the tape container. Actuation of a thread-up mechanism within the recorder then causes the following: the capstan is repositioned, thereby urging tape about itself by withdrawing tape from the tape container; the reel-drives engage respectively the supply and take-up reels within the tape container, thereby effectively removing the reels from all contact with and within the tape container; and the tape-guiding and tensioning devices guidingly withdraw additional tape from the tape container so that, except for contact with the tape container reels, the tape has virtually no other contact of any kind with any part of the tape container. Thus, functionally, the tape is transported in reel-to-reel fashion despite the use of a customer-convenience cassette-like tape container.

12 Claims, 14 Drawing Figures

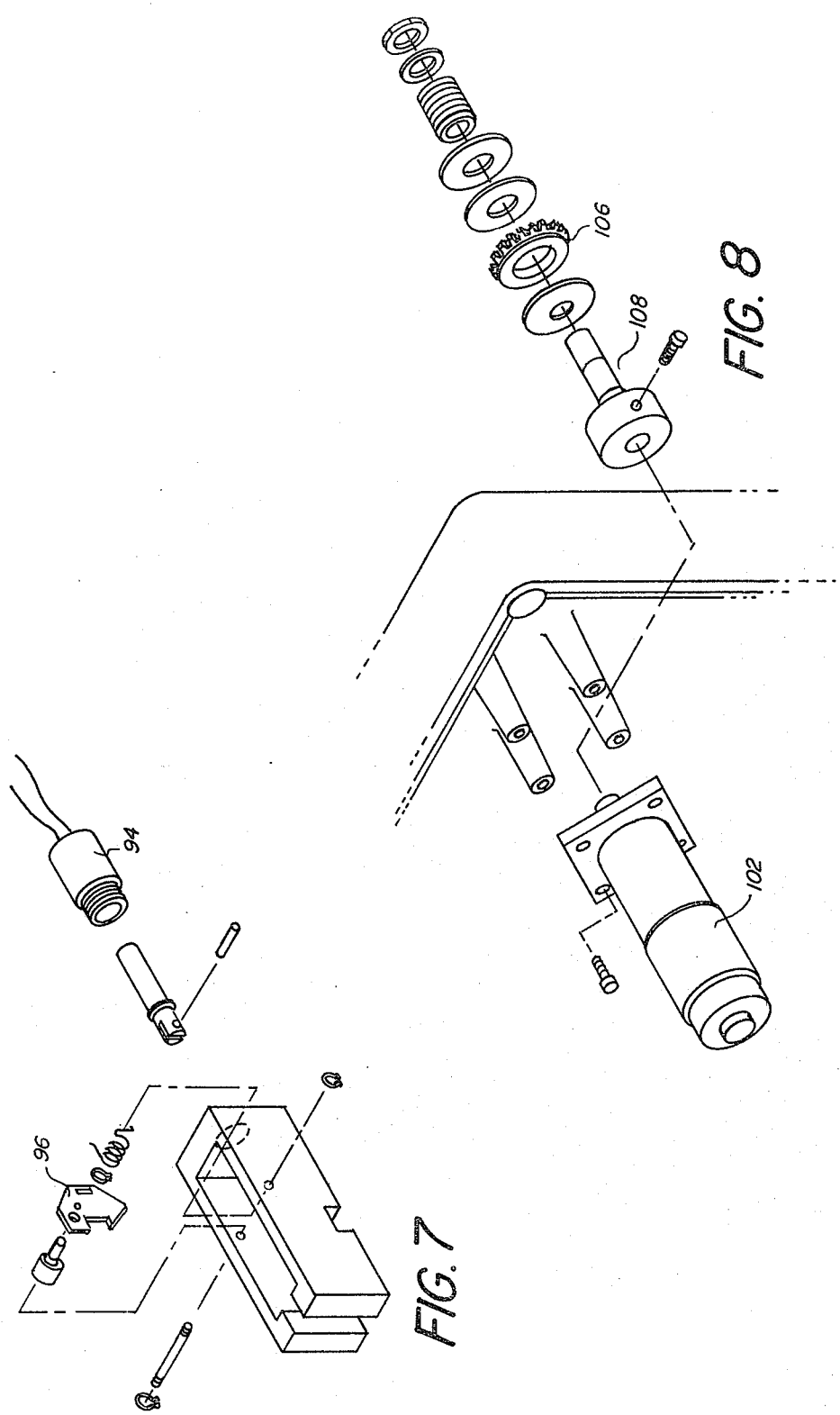

TRANSPORT APPARATUS FOR USE WITH A LINEAR TAPE RECORDER

BACKGROUND OF THE INVENTION (1) Field of the Invention

This invention relates in general to linear magnetic tape recording apparatus and in particular to precision apparatus for guidedly transporting tape within such apparatus. (A "linear" tape recording apparatus, as opposed to transverse and helical scan rotary recorders, records in the direction of the longitudinal axis of recording tape. By contrast, transverse scan and helical scan recorders record in comparatively short tracks across the tape.)

(2) Description Relative to the Prior Art

In a linear magnetic recording apparatus of the type known as the SP 2000 Motion Analysis System, available from Spin Physics, Inc., San Diego, Calif., the state of the art with respect to the transportation of magnetic recording tape within such system is tested to its limits. Such a system, as has been published, must be capable of transporting tape at varying record speeds as high as 200 inches per second (ips), and as low as 6 ips—doing so while recording in 32 separate information recording tracks which are tightly packed across tape of only one-half inch width. To assure that each of the 32 information recording tracks is always reproducible during playback, it is, of course, essential that precision be built into the recording operation, i.e. by well-defining the tape path implemented within the recording apparatus.

There is, as is known, a trend toward the use of cassettes for containing magnetic tape supply and take-up reels. Such usage obviates the need for having to thread up a transport mechanism, as is required in so-caled reel-to-reel transports, e.g. the transport employed in the Honeywell 7600 Recorder, available from Honeywell Inc., Minneapolis, Minn. The use of a cassette as part of the tape-path defining apparatus is, however, a feature that is not without detraction. For example, while a cassette-type format provides easy handleability from a user standpoint, precision must be built into the cassette and into the cassette-to-recorder interface in order to have playback repeatability. By contrast, a recorder with a reel-to-reel tape path configuration employs precision components within the recorder itself, utilizing therein precision tape-tensioning and capstan-feeding of tape to assure the requisite playback repeatability.

The trade-off between a cassette-load type apparatus and a reel-to-reel transport configuration is one to economic significance: Since there will ordinarily be a greater number of recordings than there are recorders, the matter of customer convenience must significantly outweigh the desirability of building precision into the recorder apparatus itself.

In transporting magnetic tape within a linear recorder apparatus, three general tape-driving techniques are known: (1) capstanless transportation of tape by driving tape supply and take-up reels (U.S. Pat. No. 4,256,996), (2) capstan-driving tape by utilizing a cooperating pinch-roller (U.S. Pat. No. 3,801,043), the tape to be transported being squeezed between the capstan and the pinch roller and (3) capstan-driving tape (without a pinch roller) by providing a certain amount of tape-wrap about the capstan. Whereas reel-driving take-up and supply reels is generally a rather coarse tape feeding practice, the use of a capstan-and-pitch roller tape driving format is fraught with other (potential) problems: the pitch roller, aside from being an extra precision part, may cause signal-influencing magnetostriction within the tape that it "pinches"; and, when the tape is transported at high speed, there could be a transportation jam-up at the "pinch" between the capstan and pinch roller.

Whether of the type that cooperates with a pinch roller, or of the type employing tape-wrap, all known prior art linear tape recorder capstans are of a non-positionable type, the reasons for this being that the capstan is perhaps the most critical of all tape guiding parts in any linear recorder; to fix the position of a capstan, therefore, eliminates the most ready source of tape transportation problems.

With the above as background, consideration should be given to the following problem which is solved by means of the invention:

PROBLEM

How to provide recorder-based precision tape transportation, as is inherent to the reel-to-reel format, while providing the easy loadability of tape into a linear recorder as is common to cassette-loaded recorders, the tape transportation being effected by means of a capstan of the type employing tape-wrap therearound.

SUMMARY OF THE INVENTION: PROBLEM SOLUTION

The philosophy of the present invention is to provide a cassette-like structure, i.e. a tape container, loadable into a linear recorder in such a way that, when so loaded, the tape container provides no significant guidance of any kind to tape therein. For all intents and purposes, the tape container is functionally non-existent during tape-transportation, precision guidance for the tape being provided solely by the linear recorder in reel-to-reel fashion. (As used herein, the term "tape container" shall be interpreted to mean a structure having supply and take-up reels, and having no essential tape guiding structures therein which are utilized during tape transportation). Attendantly, the tape container may be of low cost; and, while the linear recorder necessarily includes precision parts, their number is far less than the aggregation of precision parts that would be required with a plurality of tape cassettes useful with the recorder.

To implement the philosophy of the invention, use is made of the following: a pair of reel drives forming part of the tape recorder; a pair of tape guiding and tensioning devices forming part of the tape recorder; and a recorder-based capstan of the tape-wrap type. With a tape container inserted into the disclosed recorder, the two reel drives, the two tape guiding and tensioning devices, and the capstan "all" enter cutouts within the tape container. Actuation of a thread-up mechanism within the recorder then causes the following: the capstan is repositioned, thereby urging tape about itself by withdrawing tape from the tape container; the reel-drives engage respectively the supply and take-up reels within the tape container, thereby effectively removing the reels from all contact with and within the tape container; and the tape-guiding and tensioning devices guidingly withdraw additional tape from the tape container so that, except for contact with the tape container reels, the tape has virtually no other contact of any kind with any part of the tape container. Thus, functionally, the tape is transported in reel-to-reel fashion despite the use of a customer-convenience cassette-like tape container.

(U.S. Pat. No. 4,166,283 discloses the use of a tape-wrap positionable capstan in connection with helical-scan cassette-loaded recorder. The recorder of U.S. Pat. No. 4,166,283, aside from utilizing a scanning drum for guidedly recording and playing back information in relatively short tracks, employs the cassette thereof as part of the tape-path-defining apparatus.)

The invention will now be described with reference to the drawings of which:

FIG. 7 is an exploded view of a solenoid and latch assembly forming part of the tape recorder apparatus of FIG. 3;

FIG. 8 is an exploded view of a motor and clutch assembly employed for positioning the capstan of the tape recorder apparatus of FIG. 3;

To describe properly the workings of a linear tape transport according to the invention, it is believed desirable to describe first the configuration of a tape container useful with such transport:

TAPE CONTAINER

Figure 1:
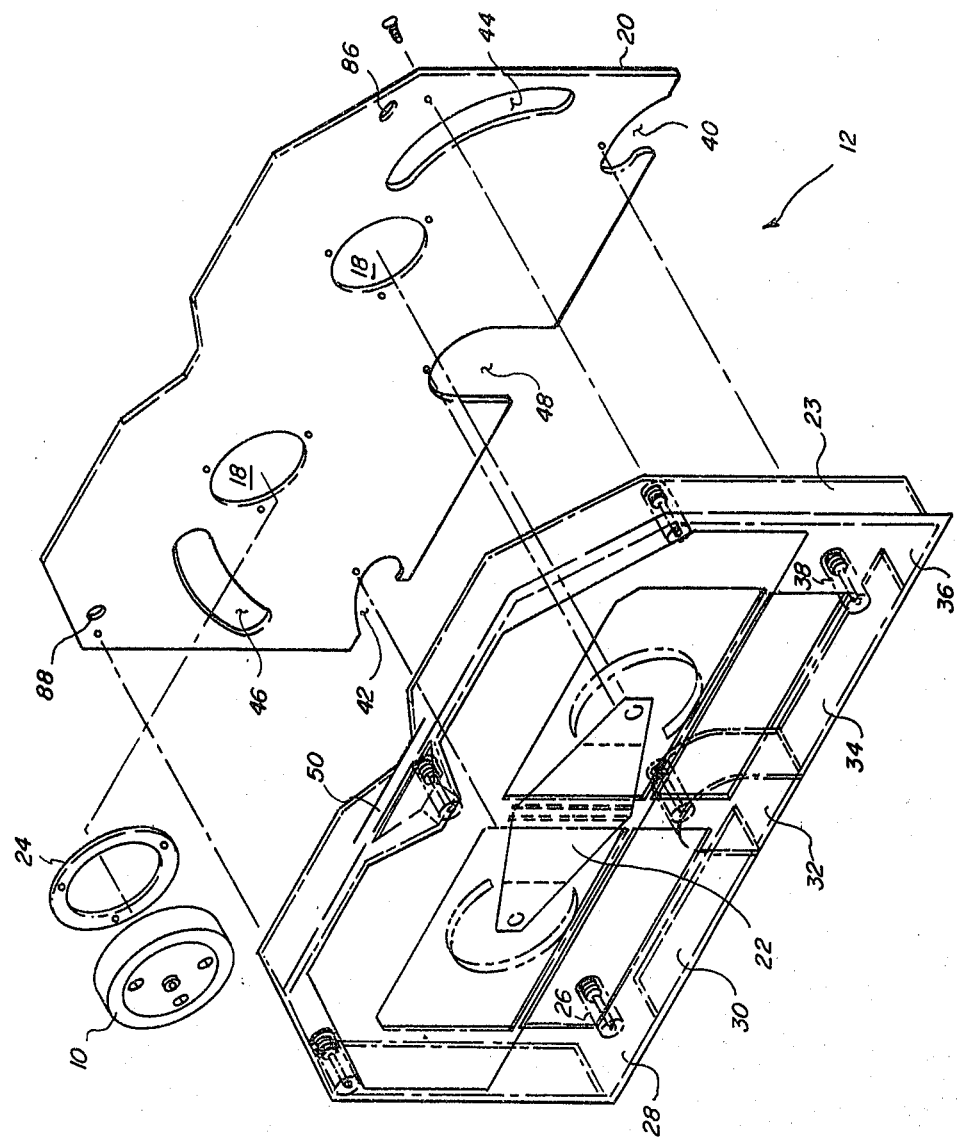
FIG. 1 is an exploded view of a tape container useful in the practice of the invention.
Figure 2:
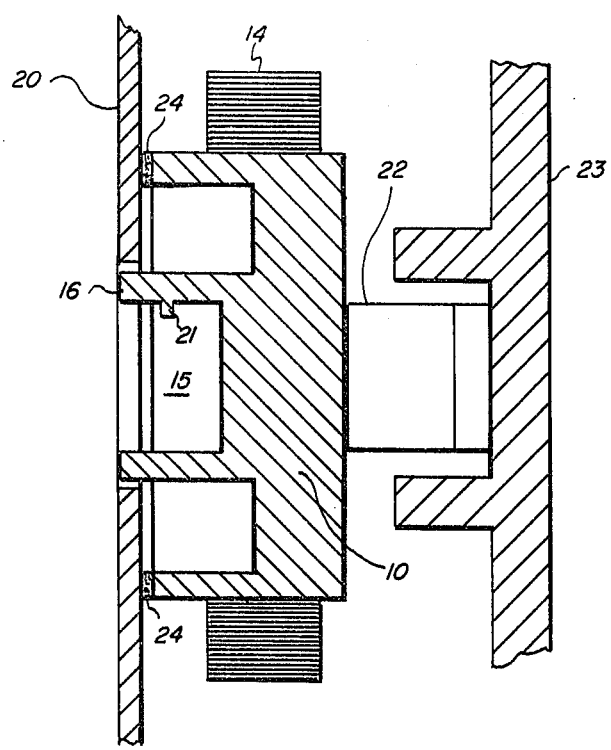
FIG. 2 is a side sectional view illustrating the reel support that is employed within the tape container of FIG. 1.

Referring to FIGS. 1 and 2, a pair of reels, like reel 10, are supported for rotation within the container 12; one reel is adapted to hold a supply of tape 14; and the other reel is adapted to take up such tape. Each reel 10 has a recessed (15) annular extension 16 that resides within a circular opening 18 in a plate 20, a tang 21 existing within the reel recess 15. The reels are held in place by a leaf spring 22 secured to a cover 23. Either on the plate 20, or on (each of) the reel(s) 10, or on both the plate and reel(s), a ring 24, e.g. of cork or polyurethane, having a high coefficient of friction is employed. Therefore, so long as the spring 22 urges the reels 10 against the plate 20, the reels 10 are braked from rotating. This prevents undesired unwinding of tape from the tape container.

With the tape container 12 freestanding, tape on one reel 10 passes over, and contacts, a post 26 within the container 12; then it passes through a window 28; then over a rib 30; then past a window 32; then over a second rib 34; then through a window 36; then over, and in contact with, a post 38 to the second of the reels.

Cutouts 40,42 and 44,46, and 48 are provided in the plate 20 and will be discussed later. A handle 50 is provided as part of the cover 23 for easy insertion of the container into the recorder.

TAPE TRANSPORT (In the interest of facilitating a description of preferred linear tape transport apparatus according to the invention, such apparatus will be described largely in relation to the way tape is loaded into, and threaded up, by such apparatus.)

Figure 3:
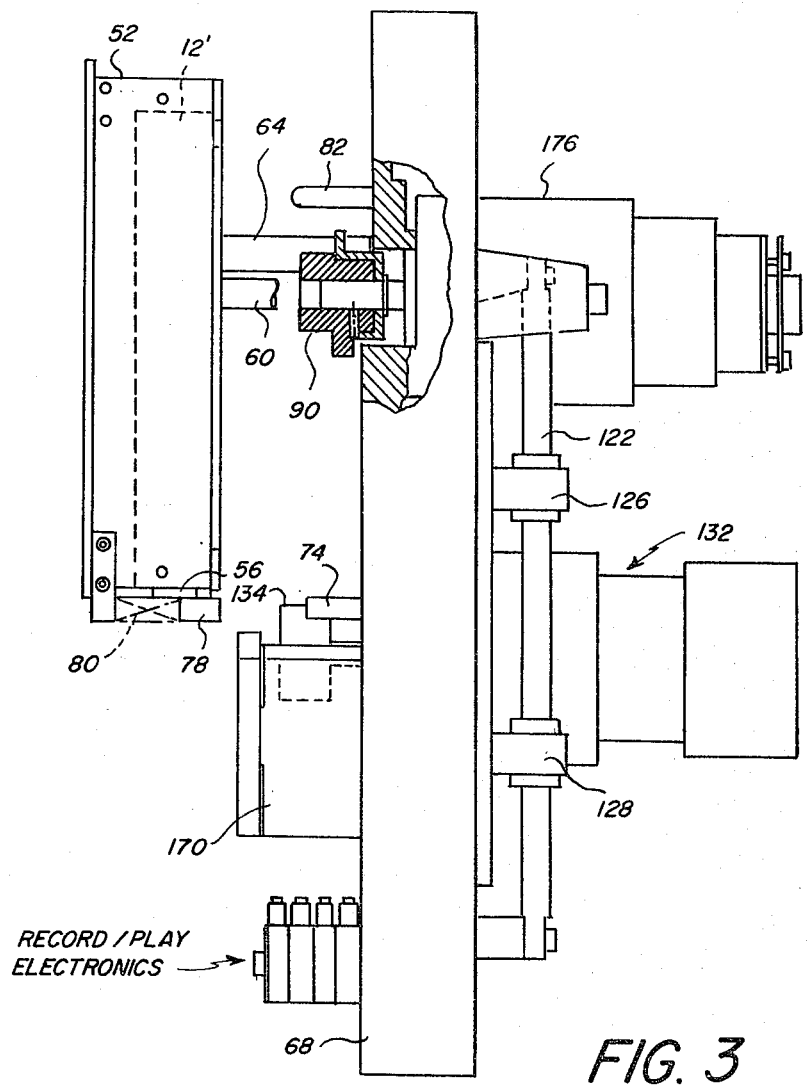
FIG. 3 is a side elevational view of tape recorder apparatus according to the invention.
Figure 4:
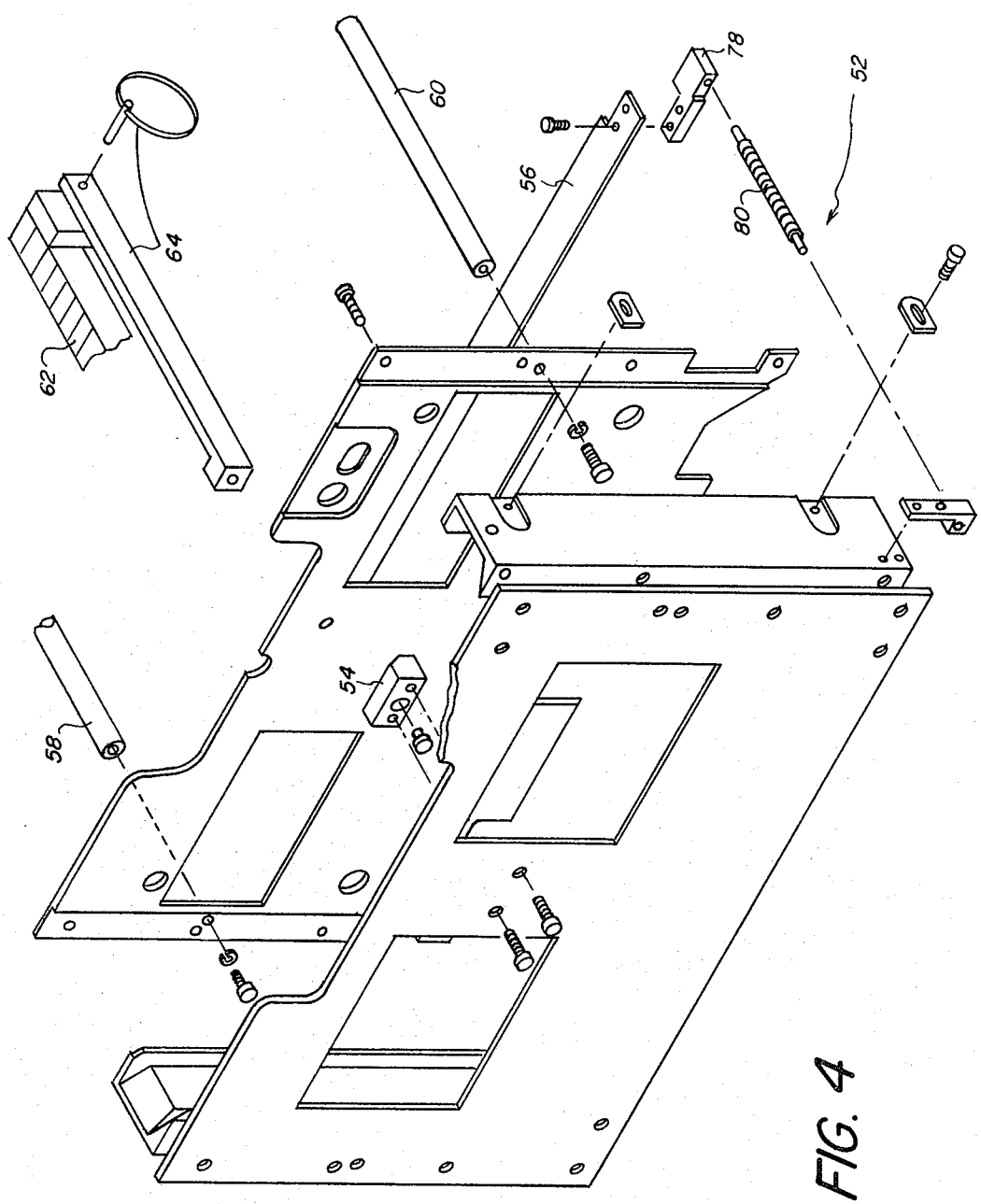
FIG. 4 is an exploded view of a tape container drawer employed in the apparatus of FIG. 3.

Referring to FIG. 3, with a tape container 12 inserted into a drawer 52, the tape container 12 is urged to the drawer-position 12' (indicated in phantom) by means of a cam 54. See FIG. 4. With the container 12 so positioned, (a catenary of) tape—which extends from the tape container window 28 to the window 36—is supported on a positionable blade 56, thereby to protect the tape from being tangled and crushed during positioning of the drawer 52. The drawer 52 is slidably supported by slide rods 58,60, and positionable by means of a rack 62 that is connected to the drawer 52 by means of a rod and pin assembly 64. The rod of the rod and pin assembly 64 extends through an aperture 66 in the transport frame 68. See FIG. 5.

On selected command, and by means of a motor 70, a pinion within a housing 72 drives the rack 62 to pull the tape container drawer 52 toward the tape transport frame 68. See FIG. 3. As this occurs, a pair of posts 74,76 engage abutments 78, coupled to the tape-supporting blade 56, thereby positioning the blade 56 against the tension of springs 80. As a result, the (catenary of) tape drops free of the blade 56, thereby allowing the tape to be withdrawn from the tape container 12.

During drawer-positioning (FIGS. 3 and 6), a pair of guide pins 82,84 enter tape container apertures 86,88 respectively. This fixes the location of the tape container vis-a-vis the tape transport. In addition, drawer-positioning causes a pair of splines 90,92 to enter the tape container 12, via the circular openings 18 thereof, and engage—by means of tangs 21—the tape supporting reels 10.

Figure 9:
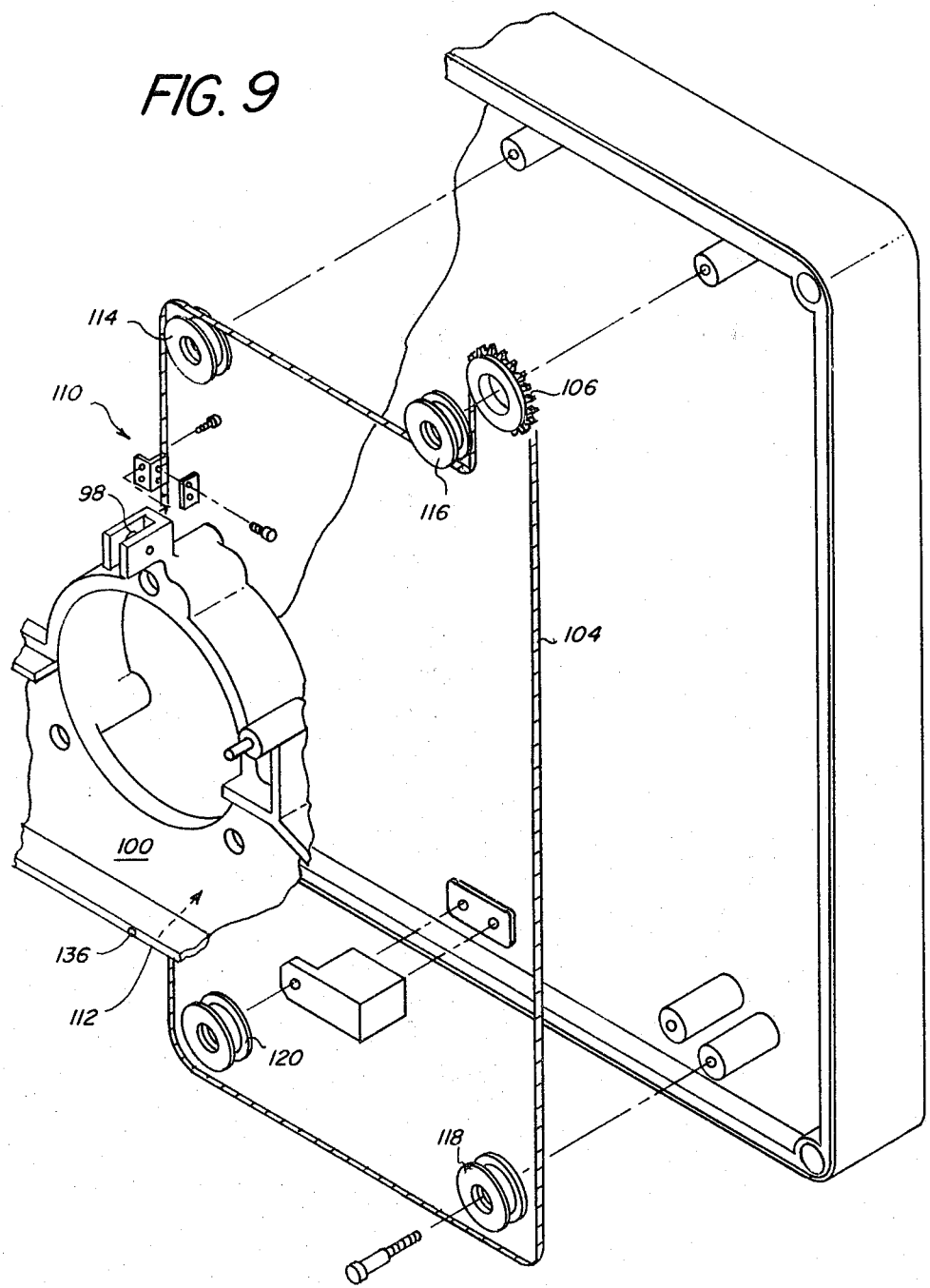
FIG. 9 is a partially cut away, perspective, exploded view of apparatus for positioning the capstan of the tape recorder apparatus of FIG. 3.

With the drawer 52 IN, a switch (not shown) is tripped, thereby energizing a latch solenoid 94. See FIGS. 5 and 7. The latch solenoid 94, when energized, causes a spring-loaded catch 96 to release a support pin 98 forming part of a capstan drive assembly 100. When the support pin 98 is released, a motor 102 (also energized when the drawer is IN) drives, via a slip clutch 108, a chain belt 104 (FIGS. 5, 8 and 9) by means of a gear 106, the slip clutch 108 serving to prevent the motor 102 from stalling when the capstan drive assembly 100 is positioned at either of its extreme positions.

Figure 5:
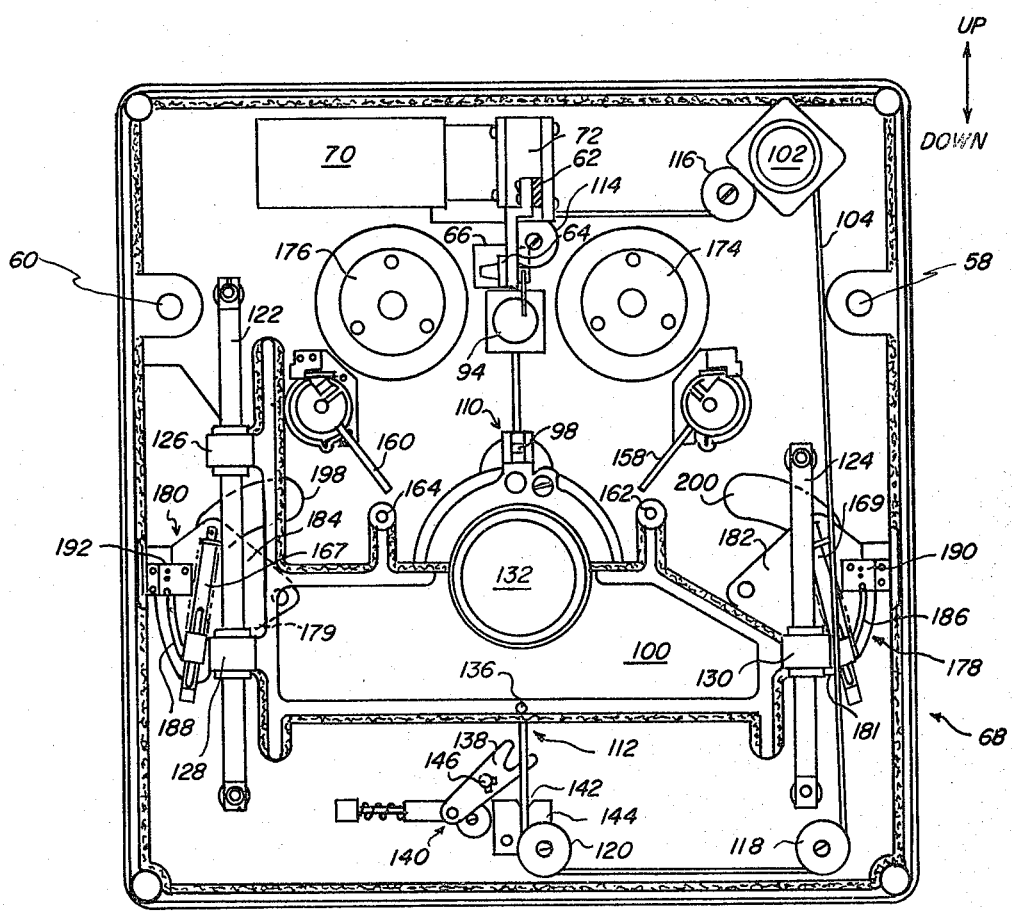
FIG. 5 is a plan view of the back side of the tape recorder apparatus of FIG. 3.
Figure 6:
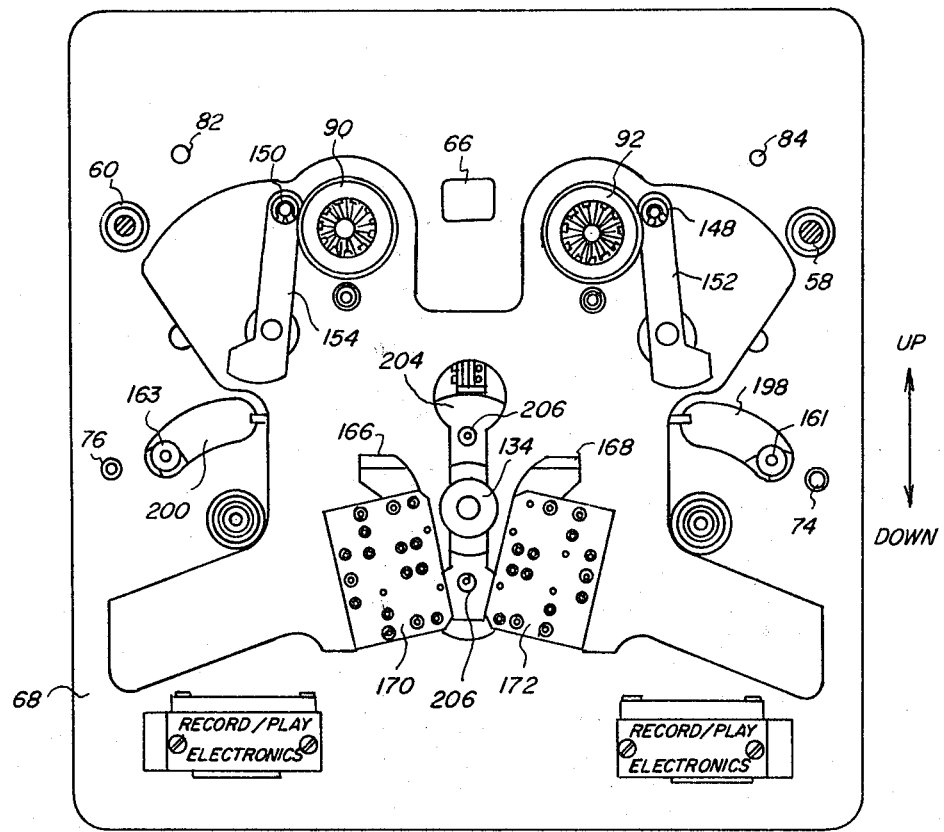
FIG. 6 is a plan view of the front side of the tape recorder apparatus of FIG. 3.

The chain belt 104 is secured, at 110 and 112, to the capstan drive assembly 100, and passes over pulleys 114,116,118,120. Therefore, assuming that the support pin 98 has just been released by the solenoid-operated catch 96, when the motor 102 drives the chain belt 104, the capstan drive assembly 100 is pulled in a downward direction toward its tape-handling position. (As depicted in FIGS. 3, 5 and 6, the capstan drive assembly 100 is located about midway between its two extreme locations.) The capstan drive assembly 100 is slidably mounted on rods 122,124 by means of journals 126,128,130; and supports a capstan motor-and-tachometer 132 which, in turn, is secured to, and drives, a capstan 134. Continued downward movement of the capstan drive assembly 100 by the pull of the chain belt 104 results in a lock pin 136 engaging the jaws 138 of a spring-loaded pivotal member 140; and, as the pin 136 enters a v-groove 142 in a seat 144, the pivotal member 140 rotates about an axis 146 to lock the pin 136 in its seat 144. Thus, the tape-handling location of the capstan 134 is precisely established—power being removed from the motor 102 at such time.

Figure 10:
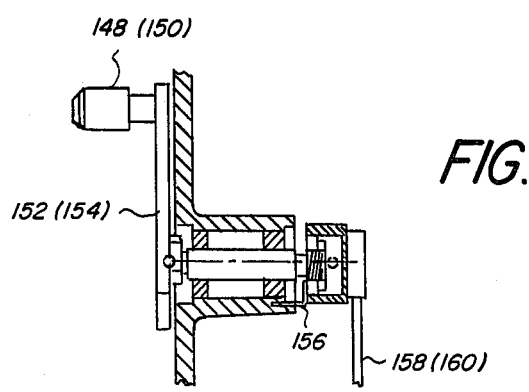
FIG. 10 is a side sectional view of a tight winding assembly employed with the tape recorder apparatus of FIG. 3.
Figure 11:
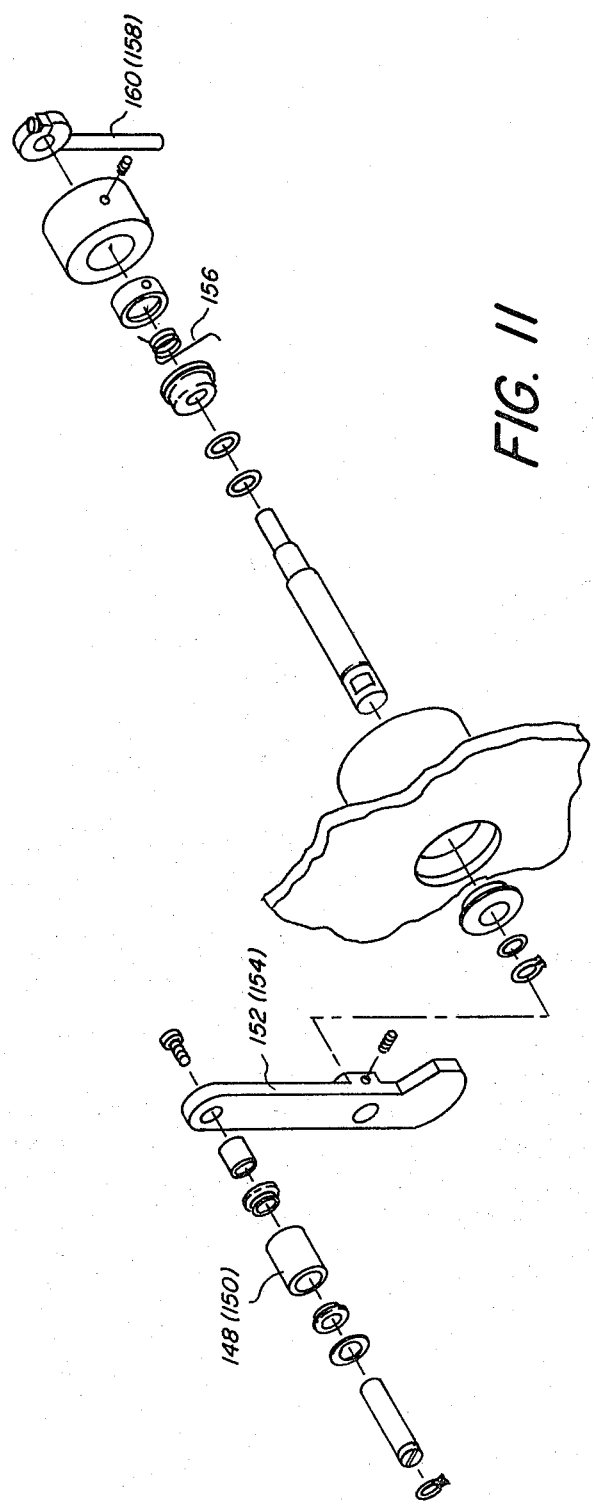
FIG. 11 is an exploded view of the tight winding apparatus of FIG. 10.

Returning for the moment to the positioning of the tape container drawer 52 to its IN position, the capstan 134 (FIG. 6) during such positioning enters the tape container cutout 48. Simultaneously, "tight winder" tape rollers 148,150 enter cutouts 44,46 of the tape container 12. The tape rollers are supported on respective arms 152,154 (FIGS. 10 and 11), such arms and rollers being arcuately positionable toward the spline-driven tape container reels 10 to release tension in springs 156—such tension having been created by means of rods 158,160 when the capstan drive assembly 100 was in its UP position. Arcuate positioning of the tape rollers 148,150, therefore, occurs because pins 162,164, supported on the downwardly moving capstan drive assembly 100 (FIG. 5), release the tension of the springs 156 as they (the pins) move downwardly away from the rods 158,160. As a result, the tape rollers 148,150 respectively move to bear against the tape on the tape container reels 10, thereby serving to squeeze air from between the tape layers and form tight windings thereof.

Figure 12:
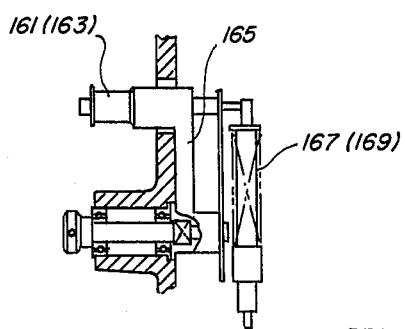
FIG. 12 is a side sectional view of a guide roller assembly employed in the tape recorder apparatus of FIG. 3.
Figure 13:
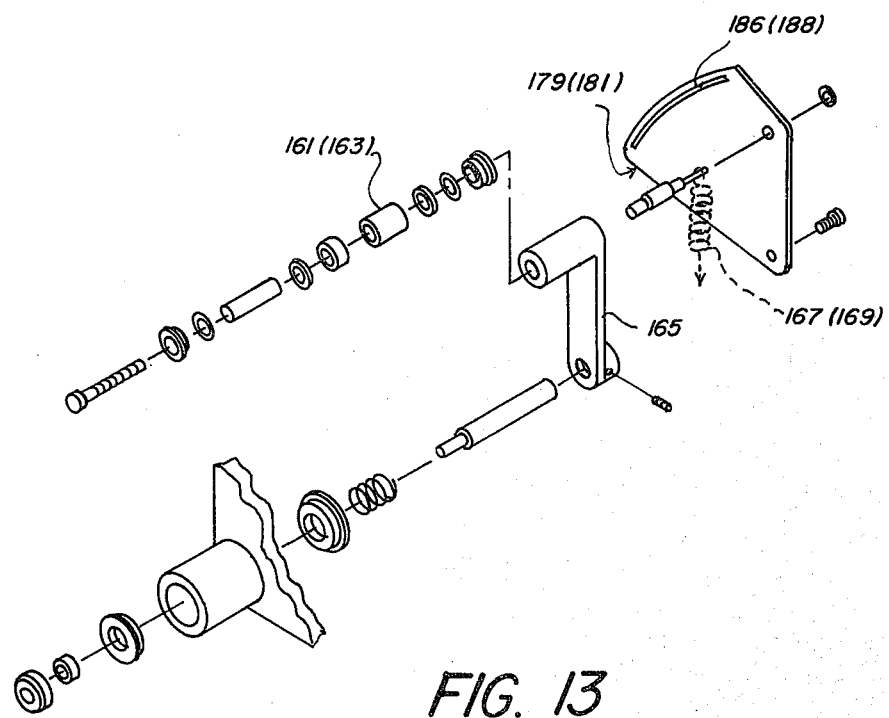
FIG. 13 is an exploded view illustrating the guide roller assembly of FIG. 12.

At the same time the capstan 134 and rollers 148,150 enter their respective cutouts 48,44,46 in the tape container 12, guide rollers 161,163 (FIGS. 12 and 13), supported on respective pivotal arms 165, enter the tape container cutouts 40,42. As the capstan drive assembly 100 moves downwardly towards its seat 144, springs 167,169 urge the guide rollers 161,163 outwardly of the capstan 134—tension in the springs 167,169 having been created by bosses (not shown), on the capstan drive assembly, which bear against edges 179,181 of pivotal vanes 182,184 coupled to the guide rollers 161,163.

With the capstan 134 and the guide rollers 161,163 within their respective cutouts 48,40,42 of the tape container 12, the downward positioning of the capstan drive assembly 100 causes the capstan to pull tape from the tape container 12 and, as such takes place, the guide rollers 161,163 move arcuately and withdraw additional tape from the tape container. Attendantly, tape on the supply reel within the tape container 12 passes through the tape container opening 28 (without ever touching the tape container), over the guide roller 163 (FIG. 6), over the capstan 134 with an amount of wrap determined by guides 166,168, over the guide roller 161 and, via the tape container opening 36, back to the take-up reel within the tape container (again without touching the tape container). What this means, then, is that—when set up for capstan driving tape past record and reproduce magnetic heads 170,172—apparatus according to the invention transports tape in true reel-to-reel fashion, drawing essentially none of its tape guidance from the tape container 12 per se.

To provide tape tension during tape transportation, spline motors 174,176 are provided. See FIG. 5. The spline motors 174,176 drive the tape reels 10 within the tape container under control of servo signals provided by mechanisms 178,180, such mechanisms including the pivotal vanes 182,184. Each pivotal vane has a respective arcuate slot 186,188; and so, when there is movement of the slots vis-a-vis photo-optic pickups 190,192, servo control signals are generated for driving the spline motors 174,176 to maintain the guide rollers 161,163 centrally positioned vis-a-vis slots 198,200 in the frame 68. See FIG. 6.

To return the capstan drive assembly 100 to its UP position, a switch (not shown) is actuated to apply reverse-sense power to the motor 102. As a result, the chain belt 104 pulls upward the capstan drive assembly 100 (re-tripping the pivotal member 140) until the catch 96 again locks onto the support pin 98; and, as the capstan drive assembly is lifted upward, the pins 162,164 bear against the rods 158,160 to rotate the "tight winder" rollers away from the tape on the tape container reels 10. During such upward movement of the capstan drive assembly 100, the following also occurs: the bosses on the capstan drive assembly bear against the vane edges 179,181 forcing the guide rollers 161,163 to move toward the capstan 134 against the tension of the springs 167,169, the length of tape released by the rollers 161,163 and the capstan 134 being drawn to within the tape container 12 by means of the spline motors 174,176. The tape container 12 may then be withdrawn from its drawer 52 by first moving the drawer to its OUT position, such being effected by applying (reverse-sense) power to the rack-and-pinion motor 70.

Figure 14:
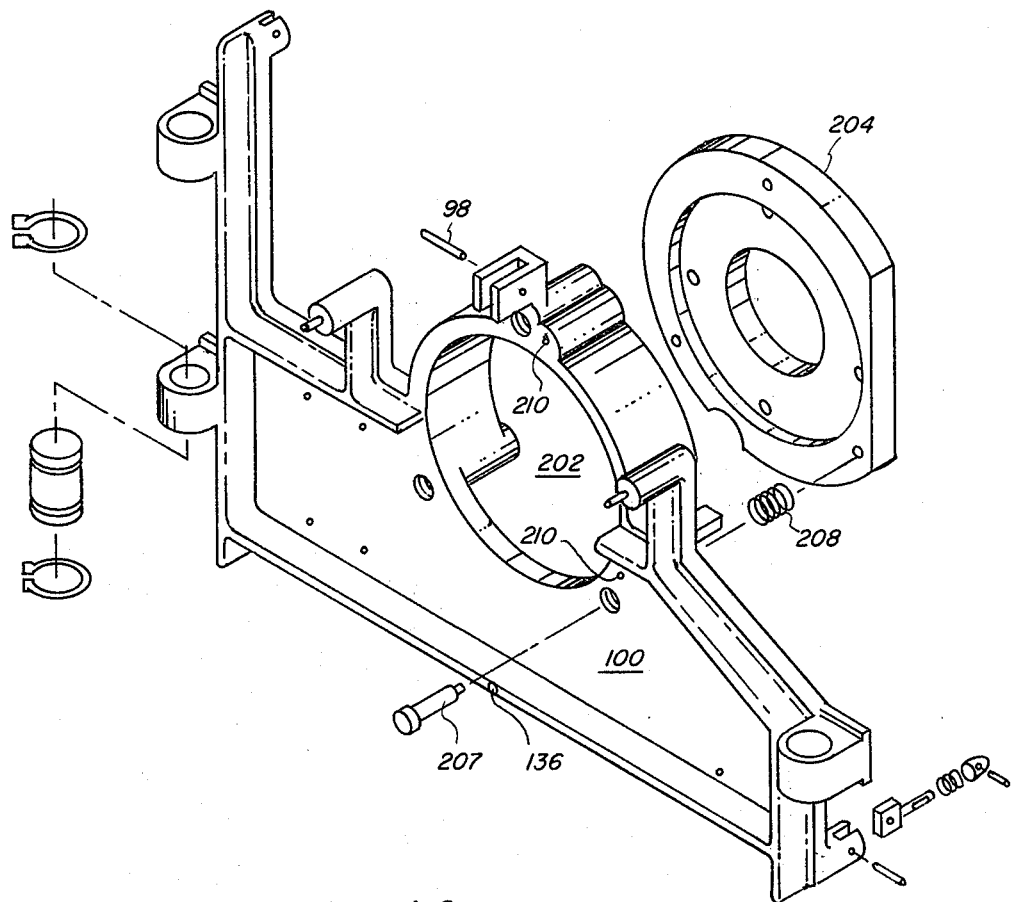
FIG. 14 is an exploded view illustrating apparatus for orienting the capstan of the tape recorder apparatus of FIG. 3.

It will be appreciated that the rotary axis of the capstan 134 must be perpendicular to the plane of the path that the tape follows during its transportation, thereby to avoid skewedly twisting the tape during such transportation. To this end (FIG. 14), the capstan motor 132, which is adapted to be carried within an opening 202 of the capstan drive assembly 100, is secured to an adjustment plate 204 by means of screws 206. See FIG. 6. The plate 204, in turn, is positionable vis-a-vis the assembly 100 by means of screws 207, springs 208 residing between the plate 204 and the assembly 100. By adjusting the screws 207, the rotary axis of the capstan drive motor 132 (which is coextensive with the rotary axis of the capstan 134) will cock with respect to the assembly 100 by an amount depending on the respective depths of travel of the screws 206 into the plate 204. Having cocked the rotary axis of the capstan 134 so that it has the requisite perpendicular orientation, set screws are threaded through screw holes 210 to lock up such orientation.

The invention has been described in detail with particular reference to preferred embodiments thereof, but it will be understood that variations and modifications can be effected within the spirit and scope of the invention.

What is claimed is:

1. Linear tape transport apparatus useful with a tape container of the type having
   (a) rotatable supply and take-up reels of and for magnetic tape therein, a length of said tape extending between said reels, and
   (b) first, second and third openings therein, said length of tape between said reels passing on the outside of said container over said first opening via said second and third openings, said second and third openings straddling said first opening, said apparatus comprising (a) a capstan, (b) first and second guide rollers, (c) means for providing relative positioning between said tape container and said tape transport apparatus so that said capstan and said guide rollers respectively enter the first, second and third openings of said tape container, and (d) means for so positioning said capstan and said guide rollers, from respective first positions within said container to respective second positions remote from said container, that said tape extends between said reels without significantly guidedly touching said container, said capstan and said guide rollers serving to wrap tape about said capstan when in their respective second positions, thereby to effect reel-to-reel linear transportation of said tape while utilizing the user convenience of a container for said tape.

2. The apparatus of claim 1 wherein said means for positioning said capstan and said guide rollers comprises in part (a) an assembly member, (b) first and second rods disposed in parallel, (c) means slidably supporting said assembly member on said rods so that said assembly member may be positioned between first and second locations thereof, and (d) a motor drivably coupled to said capstan and carried by said member.

3. The apparatus of claim 2 further comprising means cooperatively coupled to said assembly member for positioning said guide rollers in response to the positioning of said assembly member.

4. The apparatus of claim 2 further comprising (a) a seat for said assembly member disposed proximate said member when said member is at said second location thereof, and (b) means cooperative with said assembly member for locking said member in said seat, thereby to fix the position of said capstan with respect to said tape transport apparatus when said assembly member is at said second location.

5. The apparatus of claim 4 wherein said means for positioning said capstan and said guide rollers comprises (a) belt means coupled to said assembly member at first and second locations thereof, and (b) means coupled to drive said belt means and thereby position said assembly member.

6. The apparatus of claim 5 wherein said assembly member has an opening therein and wherein said capstan drive motor resides within said opening, said apparatus further including means coupled to said motor and said assembly member for adjustably orienting the direction of the rotary axis of said capstan, thereby to enable said axis to be oriented perpendicular to the plane of the tape path at said capstan.

7. The apparatus of claim 2 wherein said means for positioning said capstan and said guide rollers comprises (a) belt means coupled to said assembly member at first and second locations thereof, and (b) means coupled to drive said belt means and thereby position said assembly member.

8. The apparatus of claim 2 wherein said assembly member has an opening therein and wherein said capstan drive motor resides within said opening, said apparatus further including means coupled to said motor and to said assembly member for adjustably orienting the direction of the rotary axis of said capstan, thereby to enable said axis to be oriented perpendicular to the plane of the tape path at said capstan.

9. The apparatus of claim 2 further including (a) reel drive means adapted to engage and drive said supply and take-up reels of said tape container, and (b) tight winder means positionable, in response to the positioning of said assembly member, from first positions away from said supply and take-up reels to second positions against tape on said supply and take-up reels, thereby to bear against and squeeze air from between the layers of tape on said reels.

10. Apparatus forming part of a linear tape recorder adapted to transport tape from a supply reel thereof to take-up reel therefor, said tape extending between said reels, comprising.

(a) a capstan drive assembly comprising (1) a capstan and means for driving said capstan (b) means for guidedly positioning said capstan drive assembly from a first position where said capstan may engage said tape to pull said tape from said supply reel to a second position where said tape is as a result of said positioning, wrapped about said capstan and (c) means providing a seat for said capstan drive assembly when said assembly occupies said second position, (d) means responsive when said capstan drive assembly is positioned to its second position for locking said assembly in the seat of said seat means and for unlocking said assembly from said seat when said capstan drive assembly is positioned to its first position, wherein said means for guidedly positioning said capstan drive assembly is comprised in part of parallel rods slidably supporting said capstan drive assembly.

11. The apparatus of claim 10 wherein said means for guidedly positioning said capstan drive assembly further comprises (a) a belt the opposite ends of which are secured to and at spaced apart locations of said capstan drive assembly, and (b) a motor coupled to said belt for driving said belt, whereby said capstan drive assembly is accordingly positioned along said rods.

12. The apparatus of claim 11 including means for adjustably orienting the perpendicularity of the axis of said capstan with respect to the plane of the tape path in the vicinity of said capstan.

* * * * *

UNITED STATES PATENT OFFICE
CERTIFICATE OF CORRECTION

PATENT NO. : 4,410,149

DATED : October 18, 1983

INVENTOR(S) : Lee B. Armstrong

It is certified that error appears in the above-identified patent and that said Letters Patent are hereby corrected as shown below:

Column 1, line 35, delete "so-caled" and insert --so-called-- in its place.

Column 7, line 53, after "and" insert --to--.

Signed and Sealed this

Tenth Day of January 1984

[SEAL]

Attest:

GERALD J. MOSSINGHOFF

Attesting Officer  Commissioner of Patents and Trademarks